United States Patent
Zhang et al.

(10) Patent No.: US 11,756,275 B2
(45) Date of Patent: Sep. 12, 2023

(54) AUXILIARY SYSTEM AND METHOD FOR INTELLIGENT WELL CONTROL

(71) Applicant: VERTECHS OIL & GAS TECHNOLOGY CO., LTD., Chengdu (CN)

(72) Inventors: Wei Zhang, Chengdu (CN); Qijun Zeng, Chengdu (CN); Dengpan Xie, Chengdu (CN); Yuan Gao, Chengdu (CN)

(73) Assignee: VERTECHS OIL & GAS TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/022,765

(22) PCT Filed: Mar. 25, 2021

(86) PCT No.: PCT/CN2021/082907
§ 371 (c)(1),
(2) Date: Feb. 23, 2023

(87) PCT Pub. No.: WO2022/198547
PCT Pub. Date: Sep. 29, 2022

(65) Prior Publication Data
US 2023/0230329 A1 Jul. 20, 2023

(30) Foreign Application Priority Data
Mar. 24, 2021 (CN) .......................... 202110313135.3

(51) Int. Cl.
*G06T 19/00* (2011.01)
*G06T 11/20* (2006.01)
(Continued)

(52) U.S. Cl.
CPC ............ *G06T 19/006* (2013.01); *E21B 41/00* (2013.01); *G06F 3/167* (2013.01); *G06T 11/206* (2013.01);
(Continued)

(58) Field of Classification Search
CPC . G06T 19/006; G06T 11/206; G06T 2200/24; G06F 3/167; G06V 20/20;
(Continued)

(56) References Cited

U.S. PATENT DOCUMENTS 6,484,816 B1 * 11/2002 Koederitz ............... E21B 21/08
175/48
6,873,267 B1  3/2005 Tubel et al.
(Continued)

FOREIGN PATENT DOCUMENTS

| CN | 101737018 A | 6/2010 |
| CN | 103174397 A | 6/2013 |

(Continued)

OTHER PUBLICATIONS

Pang Dongxiao, et al., A preliminary study on the application of intelligent technology in oil test operations, 2020.

*Primary Examiner* — Jeffery A Brier
(74) *Attorney, Agent, or Firm* — BAYRAMOGLU LAW OFFICES, LLC (57) ABSTRACT

An auxiliary system for intelligent well control includes augmented reality (AR) glasses, a server, and a first sensor group. The first sensor group is configured to collect real-time data of a wellbore and the surface and transmit the real-time data to the server. The server is configured to analyze a target pressure value of a choke valve of the surface according to the real-time data, obtain an actual pressure value of the choke valve of the surface from the real-time data, and transmit the actual pressure value and the
(Continued)

target pressure value to the AR glasses. The AR glasses are configured to dynamically display the actual pressure value and the target pressure value in real time. Through the first sensor group and the server, the actual pressure value and the target pressure value can be accurately received by an operator in real time.

19 Claims, 2 Drawing Sheets

(51) Int. Cl.
    *G06F 3/16*     (2006.01)
    *G06V 20/50*     (2022.01)
    *G06V 20/20*     (2022.01)
    *H04N 7/18*     (2006.01)
    *G08B 21/02*     (2006.01)
    *E21B 41/00*     (2006.01)

(52) U.S. Cl.
    CPC .............. *G06V 20/20* (2022.01); *G06V 20/50* (2022.01); *G08B 21/02* (2013.01); *H04N 7/183* (2013.01); *G06T 2200/24* (2013.01)

(58) Field of Classification Search
    CPC ........ G06V 20/50; E21B 41/00; G08B 21/02; H04N 7/183
    See application file for complete search history.

(56) References Cited

U.S. PATENT DOCUMENTS

| | | | |
|---|---|---|---|
| 2017/0002622 A1* | 1/2017 | De Bruijn | E21B 33/14 |
| 2019/0168787 A1 | 6/2019 | Messinger et al. | |
| 2021/0047915 A1 | 2/2021 | Marshall et al. | |

FOREIGN PATENT DOCUMENTS

| | | | | | |
|---|---|---|---|---|---|
| CN | 106569769 A | | 4/2017 | | |
| CN | 107547554 A | | 1/2018 | | |
| CN | 108242126 A | | 7/2018 | | |
| CN | 108756788 A | | 11/2018 | | |
| CN | 110212451 A | | 9/2019 | | |
| CN | 111119887 A | | 5/2020 | | |
| CN | 111577240 A | | 8/2020 | | |
| CN | 111598366 A | | 8/2020 | | |
| CN | 111724487 A | * | 9/2020 | ........... | G06T 19/006 |
| CN | 112085232 A | | 12/2020 | | |
| CN | 112116163 A | | 12/2020 | | |
| CN | 112343566 A | | 2/2021 | | |
| RU | 2015123680 A | * | 2/2017 | ............. | E21B 41/00 |

\* cited by examiner

AUXILIARY SYSTEM AND METHOD FOR INTELLIGENT WELL CONTROL

CROSS REFERENCE TO THE RELATED APPLICATIONS

This application is the national phase entry of International Application No. PCT/CN2021/082907, filed on Mar. 25, 2021, which is based upon and claims priority to Chinese Patent Application No. 202110313135.3, filed on Mar. 24, 2021, the entire contents of which are incorporated herein by reference.

TECHNICAL FIELD

The present invention relates to the technical field of the oil and gas industry, particularly to an auxiliary system and method for intelligent well control.

BACKGROUND

As an important aspect of the exploration and development process of oil and gas, well control has always been in a prominent position of safe production. Especially in recent years, the exploration and development of oil and gas have gradually moved towards deep complex formations that have high temperatures and high pressures. When drilling in deep complex formations, pore pressure changes complexly in the deep complex formations. The density and rheological properties of drilling fluid are easily affected by the high temperature and high pressure and cause complex changes in wellbore pressure, which results in an imbalance of wellbore pressure and an overflow of a formation fluid that invades the wellbore. After the overflow occurs, if the control is not handled properly, it will develop into a well kick or an influx, or even an out-of-control blowout, which may cause casualties, equipment damage, and environmental pollution in severe cases.

At the drilling site, when carrying out a well control operation, an operator uses a printed well control kill sheet to guide cyclic exhaust and perform heavy mud displacement operations. At present, the well control kill sheet requires a long preparation time manually. However, a well control accident is often urgent and requires very high accuracy of the well control kill sheet. Moreover, it is required to review the well control kill sheet after the preparation of the well control kill sheet is completed. Therefore, the process of preparing the well control kill sheet often brings great pressure on the engineer and takes a lot of time. The process of preparing the well control kill sheet usually takes at least 30 minutes, before the formal process of well killing can be started, and during this process, the slippage effect of the gas influx will generate additional variables.

In addition, the well control kill sheet is unchangeable, so if there is any mishandling in the operation of the well killing process, the operator cannot timely modify the well control kill sheet. Moreover, when operating the choke valve, the operator needs to closely compare the difference between the target pressure and the actual pressure to guide the adjustment of the choke valve opening. However, the target pressure is on the well control kill sheet, while the actual pressure is on the mechanical pressure gauge, so the comparison between the target pressure and the actual pressure is not enough visual, and manual calculations may cause a difference in the comparison, which cannot reflect the influence of slight change in mud performances. In addition, the operator's line of sight needs to be switched back and forth, which will also affect the operation.

SUMMARY

To overcome the problems in the prior well control operation that the well control kill sheet takes a long preparation time, the difference of manual calculations cannot reflect the slight change in mud performance, and the switching of the operator's line of sight for comparing the target pressure and the actual pressure affects the operation, the present invention provides an auxiliary system and method for intelligent well control.

To solve the above technical problems, a first aspect of the present invention provides an auxiliary system for intelligent well control including augmented reality (AR) glasses, a server, and a first sensor group.

The first sensor group is configured to collect real-time data of a wellbore and the ground surface and transmit the real-time data to the server.

The server is configured to store configuration data of the wellbore and the ground surface, analyze a target pressure value of a choke valve inlet of the ground surface according to the configuration data and the real-time data, obtain an actual pressure value of the choke valve inlet of the ground surface from the real-time data, and transmit the actual pressure value and the target pressure value to the AR glasses.

The AR glasses are configured to dynamically display the actual pressure value and the target pressure value in real time.

The auxiliary system for intelligent well control of the present invention has the following advantages: It solves the problem in the process of well control operation that the switching of the operator's line of sight for comparing the target pressure and the actual pressure affects the operation of the operator. The first sensor group can transmit the real-time data of the wellbore and the ground surface to the server in real time, and the server can use the configuration data and the real-time data to obtain the actual pressure value and analyze the target pressure value. Therefore, through the first sensor group and the server, the actual pressure value and the target pressure value can be received by the operator accurately in real time, thus avoiding differences caused by manual calculations and further reflecting the slight change in mud performance. In addition, through the AR glasses, the actual pressure value and the target pressure value can be dynamically displayed in the operator's field of vision in real time according to the operator's line of sight, thereby avoiding the process that the operator needs to constantly change the line of sight to compare the pressures so that the operator can carry out the well control operation more intently and accurately, which improves the safety of the operator in the well control operation.

Based on the above technical solution, the auxiliary system for intelligent well control of the present invention may also be improved as follows.

Furthermore, the server is also configured to obtain mud displacement data according to the real-time data and the configuration data and transmit the mud displacement data to the AR glasses.

The AR glasses are further configured to obtain a real-scene fluid movement image that dynamically displays a mud displacement interface position according to the mud displacement data and to display the real-scene fluid movement image.

The aforementioned further solution has the following advantages: Through the calculation and analysis of the configuration data and the real-time data by the server, the mud displacement data can be obtained, where the mud displacement data includes the mud displacement interface position, a well depth, and a height. The AR glasses can perform modeling according to the mud displacement data to obtain the real-scene fluid movement image that dynamically displays the mud displacement interface position. By observing the real-scene fluid movement image, the operator can accurately carry out the well killing operation, and meanwhile, the operator can understand the real-time situation of mud displacement more visually, thereby facilitating the control of the valve according to the actual situation by the operator.

Furthermore, the server is further configured to automatically generate a well control kill sheet according to the configuration data and the real-time data and transmit the well control kill sheet to the AR glasses.

The AR glasses are further configured to display the well control kill sheet in real time.

The aforementioned further solution has the following advantages: The server integrates the configuration data and the real-time data to automatically fill in and generate the well control kill sheet, so that the operator no longer needs to spend a lot of time preparing the well control kill sheet, which greatly shortens the preparation time required when a well control accident occurs and allows the operator to have a faster response speed in the process of well control operation, thereby avoiding the case where a more serious accident is generated due to the operator's failure to carry out the well control in time. In addition, the well control kill sheet filled in according to the configuration data and the real-time data will change in real time based on the actual situation of the well control operation, and this can better assist the operator in carrying out the well control operation more accurately.

Furthermore, the AR glasses are further configured to identify a voice instruction sent by the operator and switch display content of the AR glasses according to the voice instruction.

The aforementioned further solution has the following advantages: Since the operator mainly uses both hands to control the valve during well control operation and different situations in the process of well control operation will require the operator to observe different data and parameters to carry out corresponding control, the operator controls the AR glasses to switch the display content through the voice instruction, which can free the hands of the operator to a great extent, thereby better assisting the operator in the well control operation.

Furthermore, the AR glasses are also configured to identify a dangerous working condition according to a dangerous voice instruction sent by the operator and/or the actual pressure value, to display a corresponding emergency action guidance, and/or to automatically set off an alarm according to a dangerous level of the dangerous working condition.

The aforementioned further solution has the following advantages: The operator is often required to identify the dangerous working condition in the process of well control operation and ensure the operator's safety. The AR glasses can identify the dangerous working condition in multiple dimensions by identifying the dangerous voice instruction and/or the actual pressure value, thereby enhancing the sensitivity to the dangerous working condition and ensuring the safety of the operator at the same time. In addition, the AR glasses can timely respond to dangerous working conditions by displaying the preset emergency action guidance corresponding to different dangerous levels and automatically setting off an alarm to ensure the safety of the operator.

Furthermore, the AR glasses further include a camera, and the camera is configured to capture an image of the operator's perspective in real time.

The AR glasses are further configured to transmit the image of the operator's perspective to a pre-designated electronic device in real time and provide voice communication with the pre-designated electronic device.

The aforementioned further solution has the following advantages: By capturing the image of the operator's perspective and transmitting the image of the operator's perspective to the pre-designated electronic device, the image of the operator's perspective can be shared with the pre-designated electronic device, so that the pre-designated electronic device can obtain effective first field information. In addition, the voice communication between the pre-designated electronic device and the operator allows the operator to receive remote guidance from an expert via the pre-designated electronic device during the operation so that the real-time communication between the first field and the remote expert is achieved for more effectively assisting in the decision-making of the well control.

Furthermore, the AR glasses are further configured to identify a to-be-controlled valve in the image of the operator's perspective and call out an operation instruction manual of the to-be-controlled valve.

The aforementioned further solution has the following advantages: The operation instruction manual of the to-be-controlled valve is identified and called out through the AR glasses, which can help the operator to better understand the to-be-controlled valve so that the operator can quickly and accurately control the valve.

Furthermore, the server includes a cloud server or an industrial computer server.

The cloud server can facilitate multiple users to share the configuration data, the real-time data, and other data at the same time, and the industrial computer server can be arranged directly at the job site, so it is easier for the operator to check when there is a problem.

According to a second aspect of the present invention, an auxiliary method for intelligent well control includes the following steps:

collecting, by the first sensor group, the real-time data of the wellbore and the ground surface and transmitting the real-time data to the server;

storing the configuration data of the wellbore and the ground surface in the server, and analyzing, by the server, the target pressure value of the choke valve inlet of the ground surface according to the real-time data and the configuration data;

obtaining, by the server, the actual pressure value of the choke valve inlet of the ground surface from the real-time data and transmitting the actual pressure value and the target pressure value to the AR glasses; and displaying, by the AR glasses, the actual pressure value and the target pressure value.

The auxiliary method for intelligent well control of the present invention has the following advantages: It solves the problem in the process of well control operation that the switching of the operator's line of sight for comparing the target pressure and the actual pressure affects the operation of the operator. The first sensor group can transmit the real-time data of the wellbore and the ground surface to the server in real time, and the server can use the configuration data and the real-time data to obtain the actual pressure value and analyze the target pressure value. Therefore, through the first sensor group and the server, the actual pressure value and the target pressure value can be received by the operator accurately in real time, thus avoiding differences caused by manual calculations. In addition, through the AR glasses, the actual pressure value and the target pressure value can be dynamically displayed in the operator's field of vision in real time according to the operator's line of sight, thereby avoiding the process that the operator needs to constantly change the line of sight to compare the pressures so that the operator can carry out the well control operation more intently and accurately, which improves the safety of the operator in the well control operation.

Furthermore, the auxiliary method for intelligent well control also includes:

obtaining, by the server, mud displacement data according to the real-time data and the configuration data and transmitting the mud displacement data to the AR glasses; and obtaining, by the AR glasses, a real-scene fluid movement image that dynamically displays a mud displacement interface position according to the mud displacement data and displaying the real-scene fluid movement image.

The aforementioned further solution has the following advantages: Through the calculation and analysis of the configuration data and the real-time data by the server, the mud displacement data can be obtained, where the mud displacement data includes the mud displacement interface position, a well depth, and a height. The AR glasses can perform modeling according to the mud displacement data to obtain the real-scene fluid movement image that dynamically displays the mud displacement interface position. By observing the real-scene fluid movement image, the operator can accurately carry out the well killing operation, and meanwhile, the operator can understand the real-time situation of mud displacement more visually, thereby facilitating the adjustment of the valve according to the actual situation by the operator.

BRIEF DESCRIPTION OF THE DRAWINGS

To more clearly illustrate the technical solution in the embodiments of the present invention or the prior art, the present invention is further explained below in conjunction with the drawings and embodiments.

DETAILED DESCRIPTION OF THE EMBODIMENTS

The following embodiments are further explanations of the present invention and are not limitations on the present invention.

The auxiliary system and method for intelligent well control of embodiments of the present invention are described below in conjunction with the drawings.

Embodiment 1

Figure 1:
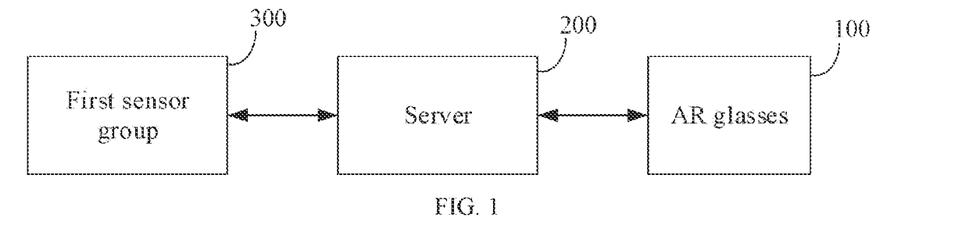
FIG. 1 is a schematic diagram of the structure of an auxiliary system for intelligent well control according to an embodiment of the present invention.

As shown in FIG. 1, according to an embodiment of the present invention, an auxiliary system for intelligent well control includes the AR glasses 100, the server 200, and the first sensor group 300.

The first sensor group 300 is configured to collect real-time data of a wellbore and the ground surface and transmit the real-time data to the server 200.

The server 200 is configured to store configuration data of the wellbore and the ground surface, analyze a target pressure value of a choke valve inlet of the ground surface according to the configuration data and the real-time data, obtain an actual pressure value of the choke valve inlet of the ground surface from the real-time data, and transmit the actual pressure value and the target pressure value to the AR glasses 100.

The AR glasses 100 are configured to dynamically display the actual pressure value and the target pressure value in real time.

Specifically, when the server 200 is a cloud server, the configuration data may be inputted into the cloud server for storage by an operator or other staff through a terminal or a backend system. When the server 200 is an industrial computer server, the configuration data may be inputted into the industrial computer server for storage by the operator or other staff through an operating console (such as an external display of an industrial computer and the associated USB device and mouse, etc.).

The configuration data includes an inner diameter, an outer diameter, a length of a drill string and drilling tool assembly, the inner diameter and outer diameter of a joint, the open hole inner diameter of the wellbore, the length and inner diameter of a casing, test results of low pumping cycle, a borehole trajectory, a borehole enlargement rate, a ground surface equipment type, the density and viscosity of inlet mud, and test results of formation strength. The configuration data further includes overflow data, such as an overflow amount, an overflow property, a shut-in vertical pressure, and a shut-in casing pressure. The real-time data includes a bit depth, a well depth, the density of outlet mud, outlet and inlet temperatures, outlet and inlet flow amounts, a vertical pressure, a casing pressure, or a downhole sensor pressure. The analysis process of the target pressure value is as follows:

1) An initial well bottom pressure using the configuration data and the historical data is calculated, and an initial target pressure value required by the ground surface (i.e. ground surface back pressure or vertical pressure) is calculated according to the initial well bottom pressure.

2) During the well killing process, an actual well bottom pressure is calculated according to the real-time data and the configuration data, and the real-time target pressure value is further calculated according to the actual well bottom pressure.

Specifically, the target pressure value is a dynamic value, which represents the value that the inlet pressure value of the choke valve achieves after the operator adjusts the choke valve, and the unit can be MPa. Generally, in the well killing process of the drilling method, when the interface between new mud and old mud does not reach a preset position, the target pressure value refers to the ground surface back pressure, and when the interface between new mud and old mud reaches the preset position, the target pressure value refers to the ground surface vertical pressure. The preset position refers to the drill bit position, and the drill bit position is dynamically changed according to the well control strategy and the well condition.

The historical data are the data of the wellbore and the ground surface collected by the first sensor group 300 before the operator starts a well killing operation.

In addition, the AR glasses can directly and dynamically display the actual pressure value and the target pressure value, or the AR glasses can convert the actual pressure value and the target pressure value into a trend chart in a curve, tree, and other formats that can show the relationship between the actual pressure value and the target pressure value more visually, and dynamically display the trend chart in real time.

The first sensor group can transmit the real-time data of the wellbore and the ground surface to the server in real time, and the server can use the configuration data and the real-time data to obtain the actual pressure value and analyze the target pressure value. Therefore, through the first sensor group and the server, the actual pressure value and the target pressure value can be received by the operator accurately in real time, thus avoiding differences caused by manual calculations. In addition, through the AR glasses, the actual pressure value and the target pressure value can be dynamically displayed in the operator's field of vision in real time according to the operator's line of sight, thereby avoiding the process that the operator needs to constantly change the line of sight to compare the pressures so that the operator can carry out the well control operation more intently and accurately, which improves the safety of the operator in the well control operation.

Preferably, the server 200 is further configured to obtain mud displacement data according to the real-time data and the configuration data and transmit the mud displacement data to the AR glasses 100.

Specifically, the configuration data of the wellbore and the ground surface include the inner diameter, the outer diameter, and the length of a drill string and drilling tool assembly, the inner diameter and outer diameter of a joint, the open hole inner diameter of the wellbore, the length and inner diameter of a casing, a borehole trajectory, a borehole enlargement rate, a ground surface equipment type, a ground surface pipeline volume and others. The configuration data is the data that is previously stored in the server 200. The real-time data includes a bit depth, a well depth, outlet and inlet flow amounts, and others.

The mud displacement data mainly includes a mud displacement interface position, and the mud displacement interface position changes in real time. The analysis process of the mud displacement data is as follows: After the start of mud displacement, the server uses the configuration data and the real-time data to calculate the front position of the new mud pumped into the wellbore by the volume method to obtain the position of the interface between the new mud and old mud as the mud displacement interface position.

The AR glasses 100 are further configured to obtain a real-scene fluid movement image that dynamically displays the mud displacement interface position according to the mud displacement data and to display the real-scene fluid movement image.

Specifically, after obtaining the mud displacement data, the AR glasses 100 establish 3D and 2D wellbore models and 3D and 2D drilling fluid models through a method of data twinning by using a physical model and the mud displacement data. With the entry of the new mud, the drilling fluid model dynamically interacts with the wellbore model to generate the real-scene fluid movement image.

By observing the real-scene fluid movement image, the operator can accurately carry out the well killing operation, and meanwhile, the operator can understand the real-time situation of mud displacement more visually, thereby facilitating the control of the valve according to the actual situation by the operator.

Preferably, the server 200 is further configured to automatically generate a well control kill sheet according to the configuration data and the real-time data and transmit the well control kill sheet to the AR glasses 100.

The AR glasses are further configured to display the well control kill sheet in real time.

Specifically, the configuration data includes the inner diameter, the outer diameter and the length of a drill string and drilling tool assembly, the inner diameter and outer diameter of a joint, the open hole inner diameter of the wellbore, the length and inner diameter of a casing, a borehole trajectory, a borehole enlargement rate, a ground surface pipeline volume, test results of formation strength, and test results of low pumping cycle. The configuration data further includes overflow data, such as an overflow amount, an overflow property, a shut-in vertical pressure, and a shut-in casing pressure. The real-time data includes a bit depth, a well depth, the density of outlet mud, outlet and inlet temperatures, outlet and inlet flow amounts, a vertical pressure, a casing pressure, or a downhole sensor pressure.

The server can dynamically generate the well control kill sheet according to the configuration data and the real-time data. Specifically, for some parameters in the well control kill sheet that cannot be obtained directly, such as well killing mud density, target pressure curve (ground surface back pressure or cyclic vertical pressure), and the like, the server can analyze and calculate these parameters according to the configuration data and the real-time data, and then automatically fill these parameters in the well control kill sheet.

The server 200 integrates the configuration data and the real-time data to automatically fill in and generate the well control kill sheet, so that the operator no longer needs to spend a lot of time preparing the well control kill sheet, which greatly shortens the preparation time required when a well control accident occurs and allows the operator to have a faster response speed in the process of well control operation, thereby avoiding the case where a more serious accident is generated due to the operator's failure to carry out the well control in time. In addition, the well control kill sheet filled in according to the configuration data and the real-time data will change in real time based on the actual situation of the well control operation, and this can better assist the operator in carrying out the well control operation more accurately.

Preferably, the AR glasses 100 are further configured to identify a voice instruction sent by the operator and switch the display content of the AR glasses according to the voice instruction.

Specifically, the AR glasses 100 can automatically identify a statement with a behavioral characteristic of the operator. For example, when the operator says "display the real-scene fluid movement image", "want to see the real-scene fluid movement image", or "switch to the real-scene fluid movement image", because the voice contains verbs with the same or similar meaning as "see" or "display" and the verbs are combined with the noun "real-scene fluid movement image" that represents the interface, the AR glasses automatically displays the real-scene fluid movement image in this case.

Since the operator mainly uses both hands to control the valve during well control operation and different situations in the process of well control operation will require the operator to observe different data and parameters to carry out corresponding control, the operator controls the AR glasses to switch the display content through the voice instruction, which can free the hands of the operator to a great extent, thereby better assisting the operator in the well control operation.

Preferably, the AR glasses 100 are further configured to identify a dangerous working condition according to a dangerous voice instruction sent by the operator and/or the actual pressure value, to display a corresponding emergency action guidance, and/or to automatically set off an alarm according to a dangerous level of the dangerous working condition.

Specifically, the AR glasses 100 are integrated with a chip configured to perform 4G/5G communication, and the AR glasses 100 can realize the automatic alarm by 4G/5G communication.

The operator is often required to identify the dangerous working condition in the process of well control operation and ensure the operator's safety. The AR glasses can identify the dangerous working condition in multiple dimensions by identifying the dangerous voice instruction and/or the actual pressure value, thereby enhancing the sensitivity to the dangerous working condition and ensuring the safety of the operator at the same time. In addition, the AR glasses can timely respond to dangerous working conditions by displaying the preset emergency action guidance corresponding to different dangerous levels and automatically setting off an alarm to ensure the safety of the operator.

Preferably, the AR glasses 100 further include a camera, and the camera is configured to capture an image of the operator's perspective in real time.

The AR glasses 100 are further configured to transmit the image of the operator's perspective to a pre-designated electronic device and provide voice communication with the pre-designated electronic device.

Specifically, the AR glasses 100 are integrated with a chip configured to perform 4G/5G communication, so that the AR glasses 100 can wirelessly communicate with an electronic device (such as a mobile phone, computer, and the like) that chooses to dial to any expert, share the image of the operator's perspective with the expert, and perform a voice communication between the operator and the expert while sharing the image of the operator's perspective. In this way, the expert can truly and visually understand the situation of the operation site, thereby allowing the expert to provide better guidance to the operator to carry out the operation.

By capturing the image of the operator's perspective and transmitting the image of the operator's perspective to the pre-designated electronic device, the image of the operator's perspective can be shared with the pre-designated electronic device, so that the pre-designated electronic device can obtain effective first field information. In addition, the voice communication between the pre-designated electronic device and the operator allows the operator to receive remote guidance from an expert via the pre-designated electronic device during the operation so that the real-time communication between the first field and the remote expert is achieved for more effectively assisting in the decision-making of the well control.

Preferably, the AR glasses 100 are further configured to identify a to-be-controlled valve in the image of the operator's perspective and call out an operation instruction manual of the to-be-controlled valve.

Specifically, the to-be-controlled valve includes a choke valve, a manual gate valve, and an automatic gate valve. When the operator with the AR glasses turns the line of sight to the to-be-controlled valve, the to-be-controlled valve will appear in the image of the operator's perspective, and at this time, the AR glasses will automatically identify the type of to-be-controlled valve and provide the corresponding operation instruction manual.

Specifically, when the choke valve appears in the image of the operator's perspective, the AR glasses automatically identify the choke valve and display a green dot next to the choke valve, where the dot is marked with "choke valve". When the operator wants to call out an operation instruction manual of the choke valve, the operator can control the AR glasses by voice to display the operation instruction manual, or the operator can also use the hand-controlled handle commonly used in the AR display device to click on the green dot to trigger the display of operation instruction manual.

The operation instruction manual of the to-be-controlled valve is identified and called out through the AR glasses, which can help the operator to better understand the to-be-controlled valve so that the operator can quickly and accurately control the valve.

Preferably, the server 200 may be a cloud server or an industrial computer server. The cloud server can facilitate multiple users to share the configuration data, the real-time data, and other data at the same time, and the industrial computer server can be arranged directly at the job site, so it is easier for the operator to check when there is a problem.

Figure 2:
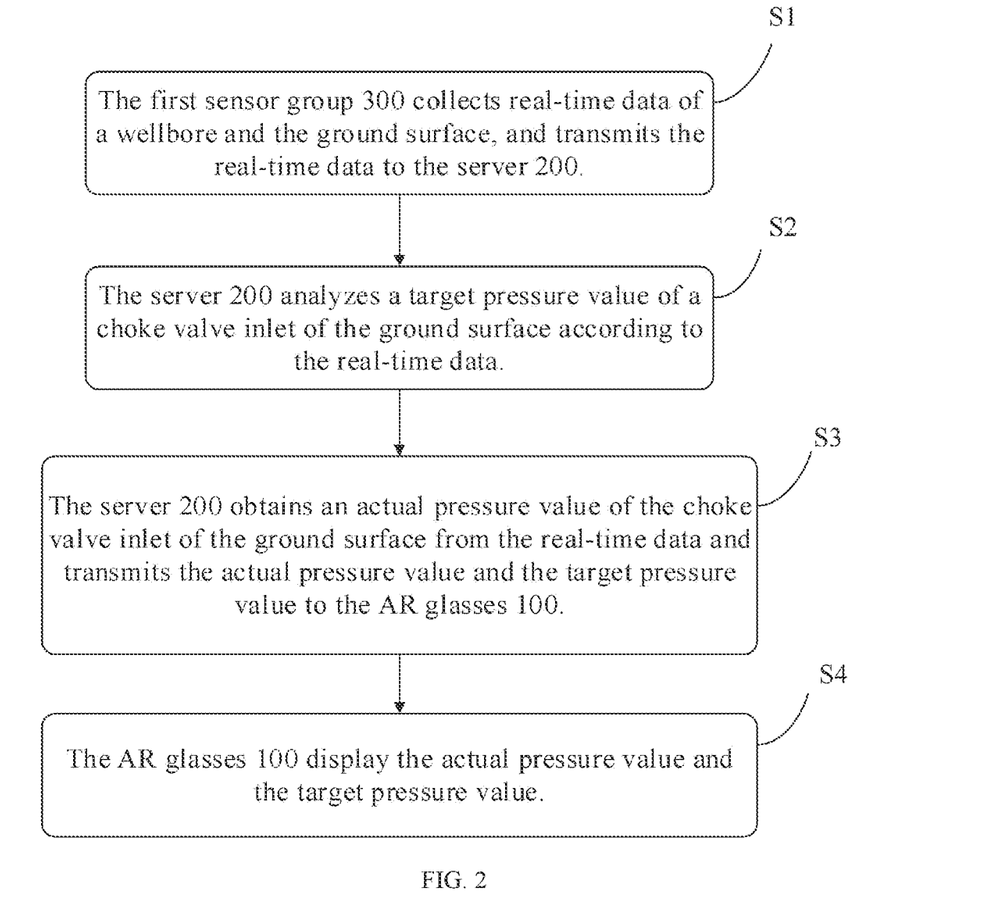
FIG. 2 is a flow diagram of an auxiliary method for intelligent well control according to an embodiment of the present invention.

As shown in FIG. 2, according to an embodiment of the present invention, an auxiliary method for intelligent well control, which is applied to the aforementioned auxiliary system for intelligent well control, includes the following steps:

S1: The first sensor group 300 collects real-time data of a wellbore and the ground surface and transmits the real-time data to the server.

S2: The configuration data of the wellbore and the ground surface is stored in the server, and the server 200 analyzes a target pressure value of a choke valve inlet of the ground surface according to the real-time data and the configuration data.

S3: The server 200 obtains an actual pressure value of the choke valve inlet of the ground surface from the real-time data and transmits the actual pressure value and the target pressure value to the AR glasses 100.

S4: The AR glasses 100 display the actual pressure value and the target pressure value.

Preferably, the auxiliary method for intelligent well control further includes:

S5: The server 200 obtains mud displacement data according to the real-time data and the configuration data and transmits the mud displacement data to the AR glasses 100.

S6: The AR glasses 100 obtain a real-scene fluid movement image that dynamically displays a mud displacement interface position according to the mud displacement data, and display the real-scene fluid movement image.

Preferably, the auxiliary method for intelligent well control further includes:

S7: The server 200 automatically generates a well control kill sheet according to the configuration data and the real-time data and transmits the well control kill sheet to the AR glasses 100. The AR glasses 100 display the well control kill sheet in real time.

Preferably, the auxiliary method for intelligent well control further includes:

S8: The AR glasses 100 identify a voice instruction sent by an operator, and switch the display content of the AR glasses 100 according to the voice instruction.

Preferably, the auxiliary method for intelligent well control further includes:

S9: The AR glasses 100 identify a dangerous working condition according to a dangerous voice instruction sent by the operator and/or the actual pressure value, to display a corresponding emergency action guidance, and/or to automatically set off an alarm according to a dangerous level of the dangerous working condition.

Preferably, the auxiliary method for intelligent well control further includes:

S10: A camera in the AR glasses 100 captures an image of the operator's perspective in real time, and the AR glasses 100 transmit the image of the operator's perspective to a pre-designated electronic device and provide voice communication with the pre-designated electronic device.

S11: The AR glasses 100 identify a to-be-controlled valve in the image of the operator's perspective and call out an operation instruction manual of the to-be-controlled valve.

In the above embodiments, although the steps are numbered, such as S1, S2, etc., they are only specific embodiments given in this application, and those skilled in the art can adjust the execution order of S1, S2, etc. according to the actual situation, which shall fall within the scope of protection of the present invention. It should be understood that some embodiments may include some or all of the above embodiments.

The parameters and the steps in the above embodiments of an auxiliary method for intelligent well control of the present invention can refer to the parameters and the steps of unit modules for realizing the corresponding functions of an auxiliary system for intelligent well control in the above content, which are not repeated herein.

Embodiment 2

Figure 3:
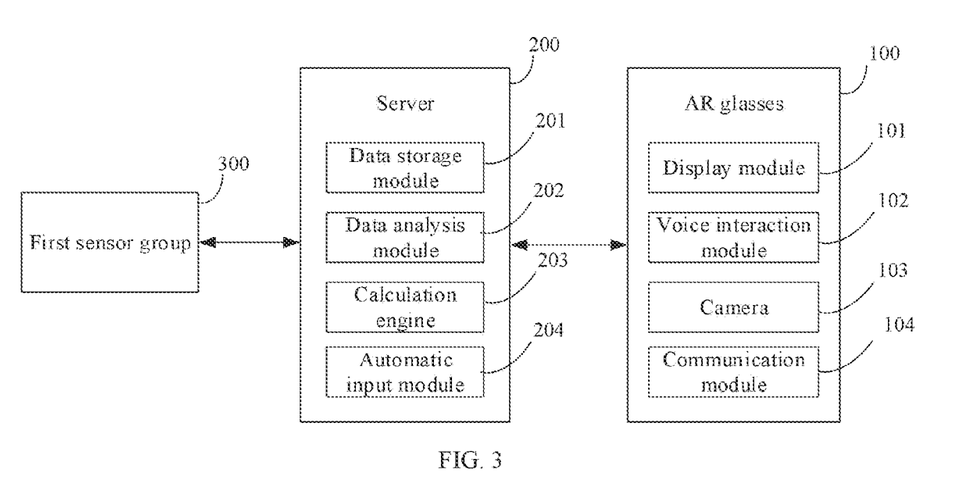
FIG. 3 is a schematic diagram of the structure of another auxiliary system for intelligent well control according to an embodiment of the present invention.

As shown in FIG. 3, according to an embodiment of the present invention, an auxiliary system for intelligent well control includes the AR glasses 100, the server 200, and the first sensor group 300.

The AR glasses 100 include the display module 101, the voice interaction module 102, the camera 103, and the wireless communication module 104.

The server 200 includes the data storage module 201, the data analysis module 202, the calculation engine 203, and the automatic input module 204.

The first sensor group 300 is configured to collect real-time data of a wellbore and the ground surface and transmit the real-time data to the server 200.

The data storage module 201 is configured to store the configuration data, the image of the operator's perspective captured by the camera 103 of the AR glasses 100 during each well control operation, an operation instruction manual of each to-be-controlled valve, and others.

The data analysis module 202 is configured to analyze a target pressure value of a choke valve inlet of the ground surface according to the configuration data and the real-time data, obtain an actual pressure value of the choke valve inlet of the ground surface from the real-time data, and transmit the actual pressure value and the target pressure value to the AR glasses 100.

The calculation engine 203 is configured to obtain mud displacement data according to the real-time data and the configuration data and transmit the mud displacement data to the AR glasses 100. The mud displacement data mainly includes a mud displacement interface position, and the mud displacement interface position is dynamic data.

The automatic input module 204 is configured to automatically generate a well control kill sheet according to the configuration data and the real-time data and transmit the well control kill sheet to the AR glasses 100.

The display module 101 of the AR glasses 100 is configured to dynamically display the actual pressure value and the target pressure value in real time. Preferably, the display module 101 can also process the actual pressure value and the target pressure value, convert the actual pressure value and the target pressure value into a trend chart in a curve, tree, and other formats that can show the relationship between the actual pressure value and the target pressure value more visually, and dynamically display the trend chart in real time.

Preferably, the display module 101 is further configured to obtain a real-scene fluid movement image that dynamically displays the mud displacement interface position according to the mud displacement data and to display the real-scene fluid movement image.

Preferably, the display module 101 is further configured to display the well control kill sheet in real time.

The wireless communication module 104 may be a chip configured to perform 4G/5G communication.

The voice interaction module 102 is configured to identify a voice instruction sent by an operator and switch the display content of the AR glasses 100 according to the voice instruction.

Specifically, the voice interaction module 102 can automatically identify a statement with a behavioral characteristic of the operator. For example, when the operator says: "display the real-scene fluid movement image", "want to see the real-scene fluid movement image", or "switch to the real-scene fluid movement image", because the voice contains verbs with the same or similar meaning as "see" or "display" and the verbs are combined with the noun "real-scene fluid movement image" that represents the interface, the AR glasses automatically displays the real-scene fluid movement image in this case.

Preferably, when the operator carries out a well killing operation, the operator can operate the choke valve and the mud pump according to the instruction and interface guidance issued by the AR glasses. At this time, the automatic input module 201 of the server 200 automatically records the accurate parameters such as shut-in vertical pressure, shut-in casing pressure, and overflow amount. Then, the calculation engine 203 of the server 200 automatically calculates the mud displacement interface depth, the controlled vertical pressure, the controlled ground surface back pressure, the flow amount, the density, and other key parameters of well killing, thereby assisting the operator in performing the well killing operation.

Preferably, the voice interaction module 102 is further configured to identify a dangerous working condition according to a dangerous voice instruction sent by the operator and/or the actual pressure value, to display a corresponding emergency action guidance, and/or to automatically set off an alarm according to a dangerous level of the dangerous working condition.

Specifically, the emergency action guidance scheme corresponding to the dangerous working conditions of different dangerous levels is previously stored in the data storage module 201 of the server 200.

1) When the operator issues a statement with an obvious characteristic of a dangerous working condition, such as "secondary dangerous" or "primary dangerous", the voice interaction module 102 quickly checks all the configuration data and the real-time data of the wellbore and the ground surface and judge whether there is a dangerous working condition and the dangerous level of the dangerous working condition to obtain a judgment result.

When the judgment result is a yes, the voice interaction module 102 calls out the corresponding emergency action guidance from the data storage module 201 of the server 200 according to the danger level of the dangerous working condition. The emergency action guidance may include using the wireless communication module 104 to automatically dial the remote expert system, automatically turning on the camera, and sending back the video of the operator's perspective and the relevant well killing operation data to seek help from an expert. When the danger level of the dangerous working condition is excessively high, the voice interaction module 102 triggers the wireless communication module 104 to set off an alarm.

When the judgment result is no, the voice interaction module 102 confirms with the operator again through voice for the dangerous working condition. If the operator gives a reply confirming that there is a dangerous working condition, the voice interaction module 102 calls out all the previously stored emergency action guidance schemes from the data storage module 201 of the server 200 for the operator to choose. If the operator does not give a reply confirming that there is a dangerous working condition, the voice interaction module 102 no longer responds.

2) When the voice interaction module 102 monitors that the actual pressure value reaches the preset pressure value during the well control operation of the operator, the voice interaction module 102 determines the dangerous level of the dangerous working condition according to the actual pressure value and calls out the corresponding emergency action guidance from the data storage module 201 of the server 200 according to the danger level of the dangerous working condition. When the danger level of the dangerous working condition is excessively high, the voice interaction module 102 triggers the wireless communication module 104 to set off an alarm. The preset pressure value changes according to the well control strategy and well conditions, and the unit can be MPa.

The camera 103 is configured to capture an image of the operator's perspective in real time, and the wireless communication module 104 transmits the image of the operator's perspective to a pre-designated electronic device in real time and provides voice communication with the pre-designated electronic device.

By capturing the image of the operator's perspective and transmitting the image of the operator's perspective to the pre-designated electronic device, the image of the operator's perspective can be shared with the pre-designated electronic device, so that the pre-designated electronic device can obtain effective first field information. In addition, the voice communication between the pre-designated electronic device and the operator allows the operator to receive remote guidance from an expert via the pre-designated electronic device during the operation so that the real-time communication between the first field and the remote expert is achieved for more effectively assisting in the decision-making of the well control.

The parameters and the steps of unit modules for realizing the corresponding functions in the above embodiments of an auxiliary system for intelligent well control of the present invention can refer to the parameters and the steps of unit modules for realizing the corresponding functions of an auxiliary system for intelligent well control in Embodiment 1 as described above, which are not repeated herein.

Those skilled in the art know that the present invention can be realized as a system, method, or computer program product. Therefore, the present invention can be specifically implemented in the following form: complete hardware, complete software (including firmware, resident software, microcode, etc.), or a combination of hardware and software, which is generally referred to as "circuit", "module" or "system" in the present invention. In addition, in some embodiments, the present invention may be implemented in the form of a computer program product in one or more computer-readable media, and the computer-readable media contain computer-readable program code.

In the description of this specification, the description of the reference term "an embodiment", "some embodiments", "examples", "specific examples", or "some examples" means that the specific features, structures, materials, or characteristics described in combination with the embodiment or example are included in at least one embodiment or example of the present invention. In this specification, the schematic representation of the above terms is not necessarily directed to the same embodiment or example. Furthermore, the specific features, structures, materials, or characteristics described may be combined in an appropriate manner in any one or more embodiments or examples. In addition, in the case of no contradiction, those skilled in the art may combine different embodiments or examples as well as the features of different embodiments or examples described in this specification.

Although embodiments of the present invention have been shown and described above, it should be understood that the above embodiments are exemplary and cannot be understood as limitations to the present invention. Those skilled in the art may perform transformation, modification, replacement, and variation on the above embodiments within the scope of the present invention.

What is claimed is:

1. An auxiliary system for intelligent well control, comprising augmented reality (AR) glasses, a server, and a first sensor group; wherein
the first sensor group is configured to collect real-time data of a wellbore and a ground surface and transmit the real-time data to the server;
the server is configured to store configuration data of the wellbore and the ground surface, analyze a target pressure value of a choke valve inlet of the ground surface according to the configuration data and the real-time data, obtain an actual pressure value of the choke valve inlet of the ground surface from the real-time data, and transmit the actual pressure value and the target pressure value to the AR glasses;
the AR glasses are configured to dynamically display the actual pressure value and the target pressure value in real time;
the server is further configured to obtain mud displacement data according to the real-time data and the configuration data and transmit the mud displacement data to the AR glasses; and the AR glasses are further configured to obtain a real-scene fluid movement image that dynamically displays a mud displacement interface position according to the mud displacement data and to display the real-scene fluid movement image.

2. The auxiliary system for intelligent well control according to claim 1, wherein the server is further configured to automatically generate a well control kill sheet according to the configuration data and the real-time data and transmit the well control kill sheet to the AR glasses; and the AR glasses are further configured to display the well control kill sheet in real time.

3. The auxiliary system for intelligent well control according to claim 1, wherein the AR glasses are further configured to identify a voice instruction sent by an operator and switch display content of the AR glasses according to the voice instruction.

4. The auxiliary system for intelligent well control according to claim 3, wherein the AR glasses are further configured to identify a dangerous working condition according to a dangerous voice instruction sent by the operator and/or the actual pressure value, to display a corresponding emergency action guidance, and/or to automatically set off an alarm according to a dangerous level of the dangerous working condition.

5. The auxiliary system for intelligent well control according to claim 1, wherein the AR glasses further comprise a camera, wherein the camera is configured to capture an image of the operator's perspective in real time; and the AR glasses are further configured to transmit the image of the operator's perspective to a pre-designated electronic device in real time and provide voice communication with the pre-designated electronic device.

6. The auxiliary system for intelligent well control according to claim 4, wherein the AR glasses are further configured to identify a to-be-controlled valve in the image of the operator's perspective and call out an operation instruction manual of the to-be-controlled valve.

7. The auxiliary system for intelligent well control according to claim 1, wherein the server comprises a cloud server or an industrial computer server.

8. An auxiliary method for intelligent well control, employing the auxiliary system for intelligent well control according to claim 1, and comprising the following steps:

collecting, by the first sensor group, the real-time data of the wellbore and the ground surface and transmitting the real-time data to the server;

storing the configuration data of the wellbore and the ground surface in the server, and analyzing, by the server, the target pressure value of the choke valve inlet of the ground surface according to the real-time data and the configuration data;

obtaining, by the server, the actual pressure value of the choke valve inlet of the ground surface from the real-time data and transmitting the actual pressure value and the target pressure value to the AR glasses; and displaying, by the AR glasses, the actual pressure value and the target pressure value.

9. The auxiliary method for intelligent well control according to claim 8, further comprising:

obtaining, by the server, the mud displacement data according to the real-time data and the configuration data and transmitting the mud displacement data to the AR glasses; and obtaining, by the AR glasses, the real-scene fluid movement image that dynamically displays a mud displacement interface position according to the mud displacement data and displaying the real-scene fluid movement image.

10. The auxiliary system for intelligent well control according to claim 2, wherein the server comprises a cloud server or an industrial computer server.

11. The auxiliary system for intelligent well control according to claim 3, wherein the server comprises a cloud server or an industrial computer server.

12. The auxiliary system for intelligent well control according to claim 4, wherein the server comprises a cloud server or an industrial computer server.

13. The auxiliary system for intelligent well control according to claim 5, wherein the server comprises a cloud server or an industrial computer server.

14. The auxiliary system for intelligent well control according to claim 6, wherein the server comprises a cloud server or an industrial computer server.

15. The auxiliary method for intelligent well control according to claim 8, further comprising:

automatically generating, by the server, a well control kill sheet according to the configuration data and the real-time data and transmitting the well control kill sheet to the AR glasses; and displaying, by the AR glasses, the well control kill sheet in real time.

16. The auxiliary method for intelligent well control according to claim 8, further comprising:

identifying, by the AR glasses, a voice instruction sent by an operator; and switching, by the AR glasses, display content of the AR glasses according to the voice instruction.

17. The auxiliary method for intelligent well control according to claim 16, further comprising:

identifying, by the AR glasses, a dangerous working condition according to a dangerous voice instruction sent by the operator and/or the actual pressure value;

displaying, by the AR glasses, a corresponding emergency action guidance; and/or automatically setting off, by the AR glasses, an alarm according to a dangerous level of the dangerous working condition.

18. The auxiliary method for intelligent well control according to claim 8, wherein the AR glasses further comprise a camera and wherein the method further comprises:

capturing, by the camera, an image of the operator's perspective in real time; and transmitting, by the AR glasses, the image of the operator's perspective to a pre-designated electronic device in real time; and providing voice communication with the pre-designated electronic device.

19. The auxiliary method for intelligent well control according to claim 18, further comprising:

identifying, by the AR glasses, a to-be-controlled valve in the image of the operator's perspective; and calling out, by the AR glasses, an operation instruction manual of the to-be-controlled valve.

* * * * *